June 20, 1961 A. M. COKER 2,989,294

METHOD AND APPARATUS FOR DEVELOPING OIL FIELDS USING TUNNELS

Filed May 10, 1956 10 Sheets-Sheet 1

INVENTOR.
Alfred M. Coker
BY Fidler, Crouser Beardsley
Att'ys.

June 20, 1961 A. M. COKER 2,989,294

METHOD AND APPARATUS FOR DEVELOPING OIL FIELDS USING TUNNELS

Filed May 10, 1956 10 Sheets-Sheet 2

INVENTOR.
Alfred M. Coker
BY Fidler, Crouser Beardsley
Attys.

June 20, 1961 A. M. COKER 2,989,294

METHOD AND APPARATUS FOR DEVELOPING OIL FIELDS USING TUNNELS

Filed May 10, 1956 10 Sheets-Sheet 3

INVENTOR.
Alfred M. Coker
BY Fidler, Crouse & Beardsley
Att'ys.

INVENTOR.
Alfred M. Coker
BY Fidler, Crouser
Beardsley
Att'ys.

INVENTOR.
Alfred M. Coker
BY Fidler, Crouse & Beardsley
Att'ys.

June 20, 1961 A. M. COKER 2,989,294

METHOD AND APPARATUS FOR DEVELOPING OIL FIELDS USING TUNNELS

Filed May 10, 1956 10 Sheets-Sheet 6

INVENTOR.

Alfred M. Coker

BY Fidler, Crouse & Beardsley

Att'ys.

June 20, 1961 A. M. COKER 2,989,294

METHOD AND APPARATUS FOR DEVELOPING OIL FIELDS USING TUNNELS

Filed May 10, 1956 10 Sheets-Sheet 7

INVENTOR.
Alfred M. Coker
BY Fidler, Crouse & Beardsley Att'ys.

INVENTOR.
Alfred M. Coker
BY Fidler, Crouse & Beardsley
Att'ys.

June 20, 1961 A. M. COKER 2,989,294

METHOD AND APPARATUS FOR DEVELOPING OIL FIELDS USING TUNNELS

Filed May 10, 1956 10 Sheets-Sheet 9

INVENTOR.
Alfred M. Coker
BY Fidler, Crouse & Beardsley
Att'ys.

June 20, 1961

A. M. COKER 2,989,294

METHOD AND APPARATUS FOR DEVELOPING OIL FIELDS USING TUNNELS

Filed May 10, 1956

10 Sheets-Sheet 10

INVENTOR.

Alfred M. Coker

BY Fidler, Crouse & Beardsley

Att'ys 2,989,294

METHOD AND APPARATUS FOR DEVELOPING OIL FIELDS USING TUNNELS

Alfred M. Coker, 1806 Douglas St., Omaha, Nebr.

Filed May 10, 1956, Ser. No. 584,029
10 Claims. (Cl. 262—1)

This invention relates to a method and apparatus for developing oil fields, and it is an object of the invention to provide an improved method and apparatus of that character.

A method or apparatus embodying the present invention may be employed in the development of any oil field, in which application it may serve to decrease the cost of drilling a large number of wells. It is also well adapted to the development of oil fields which are inaccessible by conventional methods. An example of such a relatively inaccessible oil field is one which is located offshore under a body of water.

One embodiment of the present invention involves the sinking of a shaft starting at an accessible and convenient location as close as possible to a suspected or known oil field. A generally horizontal tunnel is then driven from the shaft, at a point adjacent the bottom thereof, to a point overlying the suspected oil field. If the shaft itself overlies the oil field the tunnel may be relatively short; otherwise, a tunnel several miles in length may be required. In any event a generally horizontal tunnel of reasonable length is driven in the interest of convenience in the performance of subsequent operations. Headroom is then provided at one or more locations in the tunnel or tunnel system for drilling operations. Certain features of the present invention relate to the safe yet practical drilling of wells from an enclosed space such as the above-mentioned tunnel system. More particularly a method and apparatus incorporating various features of the present invention effectively safeguard against blowouts and the accumulation of explosive gas mixtures. In accordance with one embodiment of the invention these features of the invention include the provision of a substantially hermetically sealed drill mud system to prevent the escape of gas therefrom, and a safety gallery which is relatively remote and isolated from the working areas of the tunnel system and which has apparatus therein to prevent blowouts or at least to confine the dangerous effects of blowouts to such safety gallery.

It will be apparent that with the provision of adequate working space and safety precautions, the basic method briefly described above may substantially reduce the required overall depth of actual drilling, and that the cost of sinking the shaft and driving the necessary tunnel system may be offset by the saving thus effected in drilling some determinable number of wells. After this point has been reached there is a net saving in the drilling of further wells from the tunnel system.

In one particular application of the present invention, namely the drilling of wells under a body of water, the cost of sinking the necessary shaft and driving the necessary tunnel or tunnel system may be offset by the cost of the necessary "island" which is presently employed in offshore drilling. Further savings are effected in such an application of the present method where groups of wells are to be sunk at spaced points since it is necessary only to extend the tunnel system, whereas presently known methods require the establishment of a new island. The sinking of oil wells in accordance with the present method permits access to oil fields which are substantially removed from the shoreline and at a relatively shallow depth whereas "whipstocking" from the shoreline cannot reach such fields since the angle at which such drilling can be effected is limited. Another advantage of the present method and apparatus in this particular application is that it avoids ordinances existing in some areas which prohibit the construction of man-made islands or the construction of conventional oil well rigging at or near the shoreline. As will subsequently be explained in detail the present method and apparatus may be employed with nothing more than a conventional building adjacent the shoreline.

Accordingly, it is another object of the invention to provide an improved method and apparatus for developing oil fields which decrease the cost of sinking a plurality of wells from a given location.

It is another object of the invention to provide an improved method and apparatus for developing oil fields which are situated in relatively inaccessible locations.

It is another object of the invention to provide an improved method and apparatus for developing offshore oil fields without the employment of an island or surface drill rigging.

It is another object of the invention to provide an improved method and apparatus for drilling wells from a tunnel system.

It is another object of the invention to provide an improved method and apparatus for drilling wells from a tunnel system which provide adequate protection against the development of dangerous gas conditions.

It is another object of the invention to provide an improved method and apparatus for drilling wells from a tunnel system and which confine the dangerous effects of a blowout to a location which is isolated from the working area of the tunnel system.

It is another object of the invention to provide improved apparatus for drilling wells from a tunnel system, which apparatus includes a substantially hermetically sealed drill mud system.

It is another object of the invention to provide an improved method of drilling wells from a tunnel system which includes the provision of a safety gallery which is relatively remote and isolated from the working areas of the tunnel system and which has safety apparatus arranged therein for isolating the dangerous effects of a blowout.

It is another object of the invention to provide an improved method and apparatus for developing oil fields, having various of the characteristics specified above while being safe, reliable and economical.

In the drawings in which like parts are designated by like reference numerals:

Figure 13:
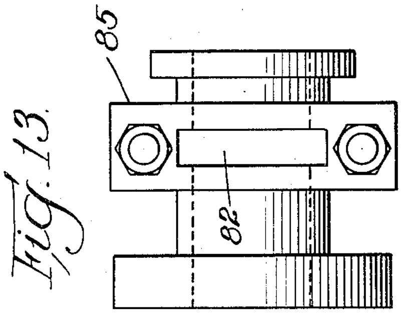
FIG. 13 is an end view of the apparatus shown in FIG. 11.
Figure 13A:
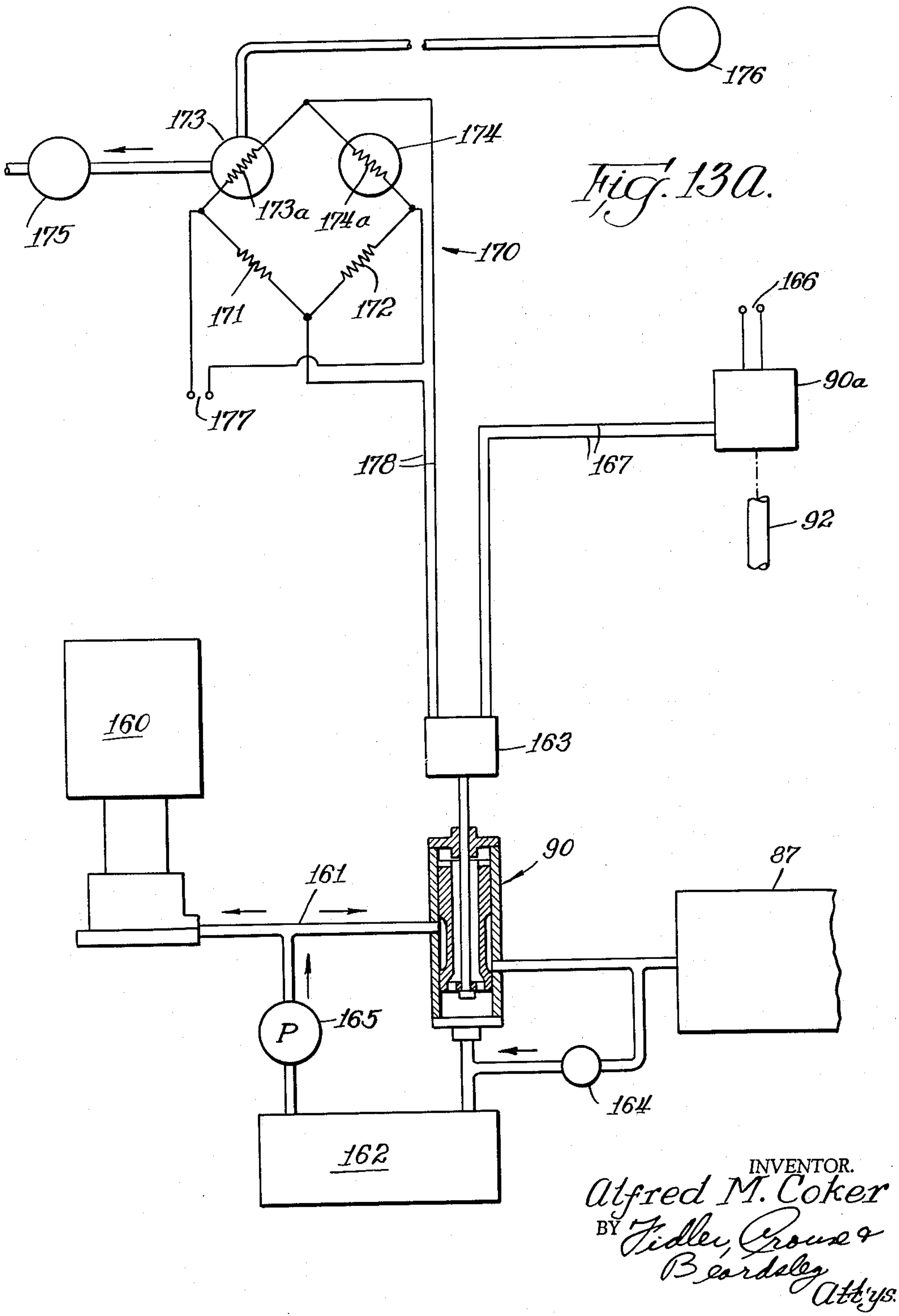
Figure 14:
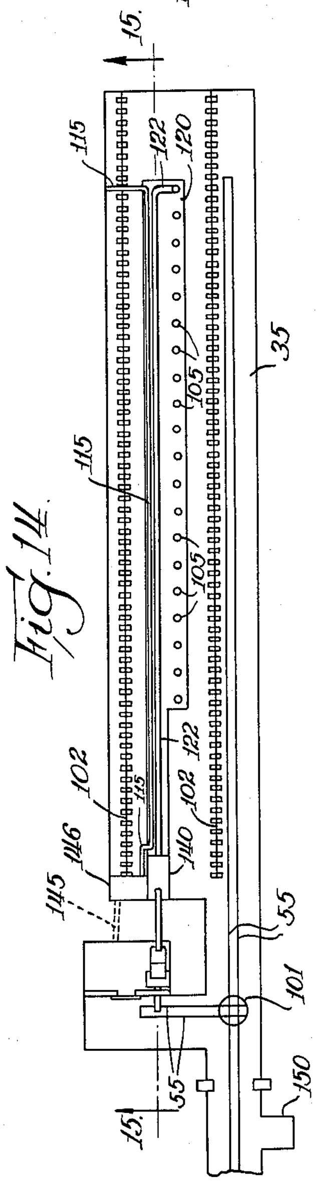
Figures 15, 16, 17:
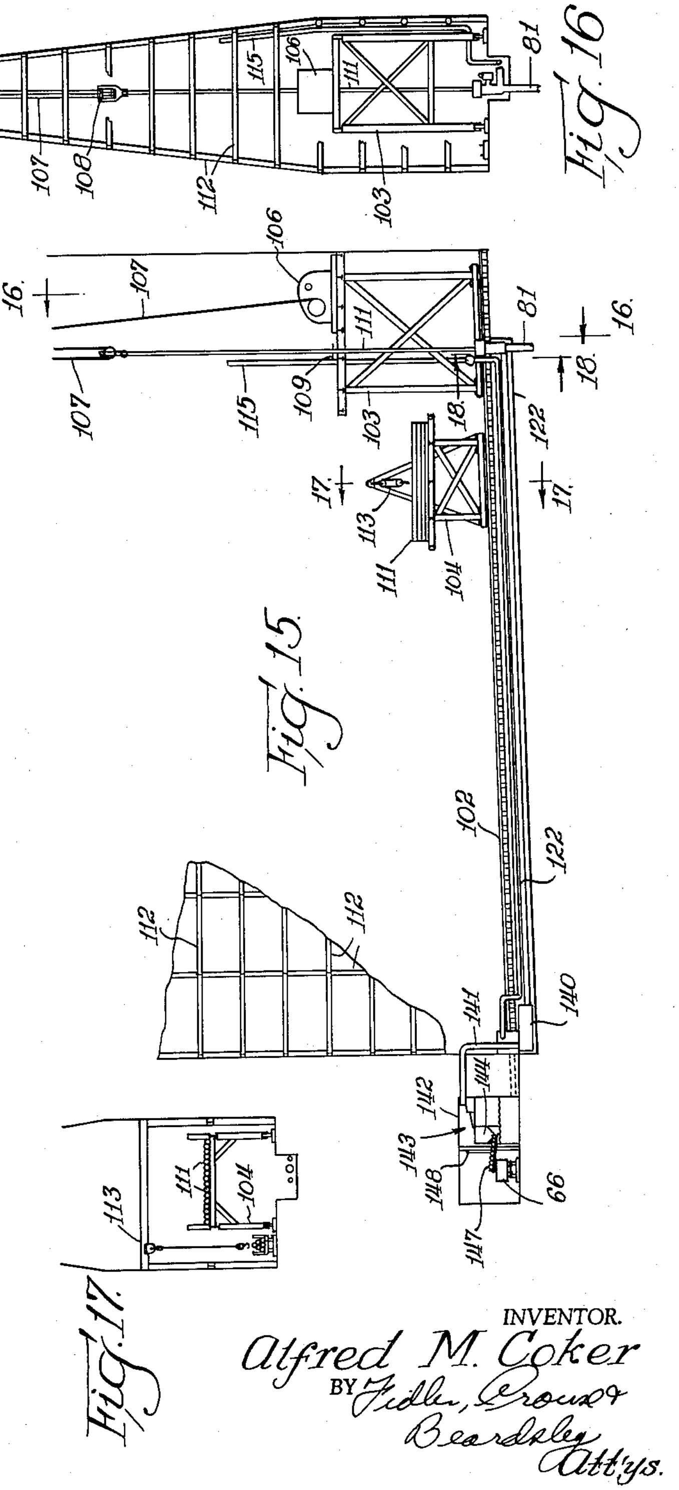
Figure 18:
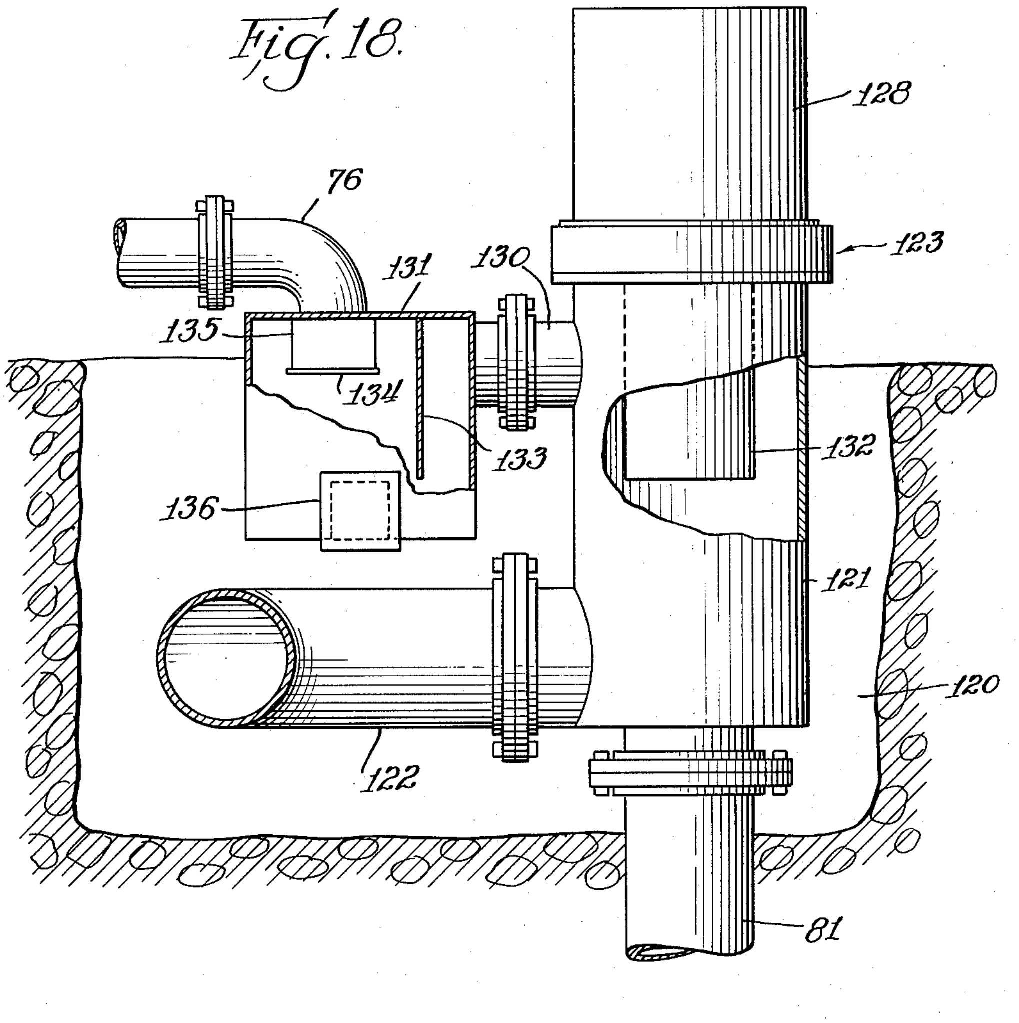
Figure 19:
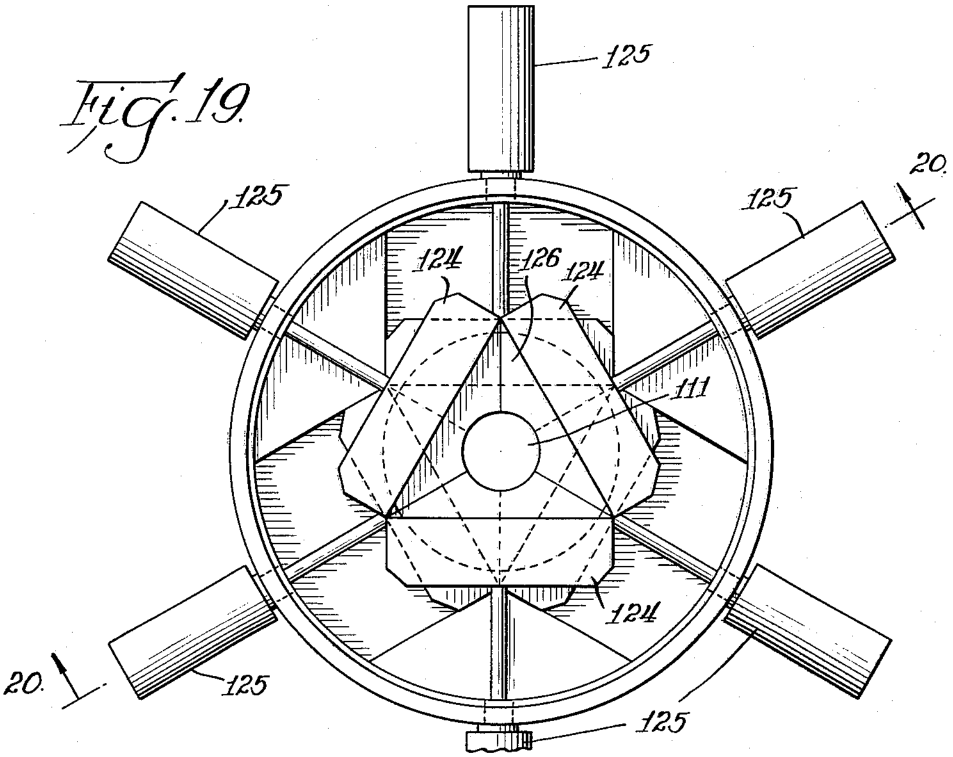
Figure 20:
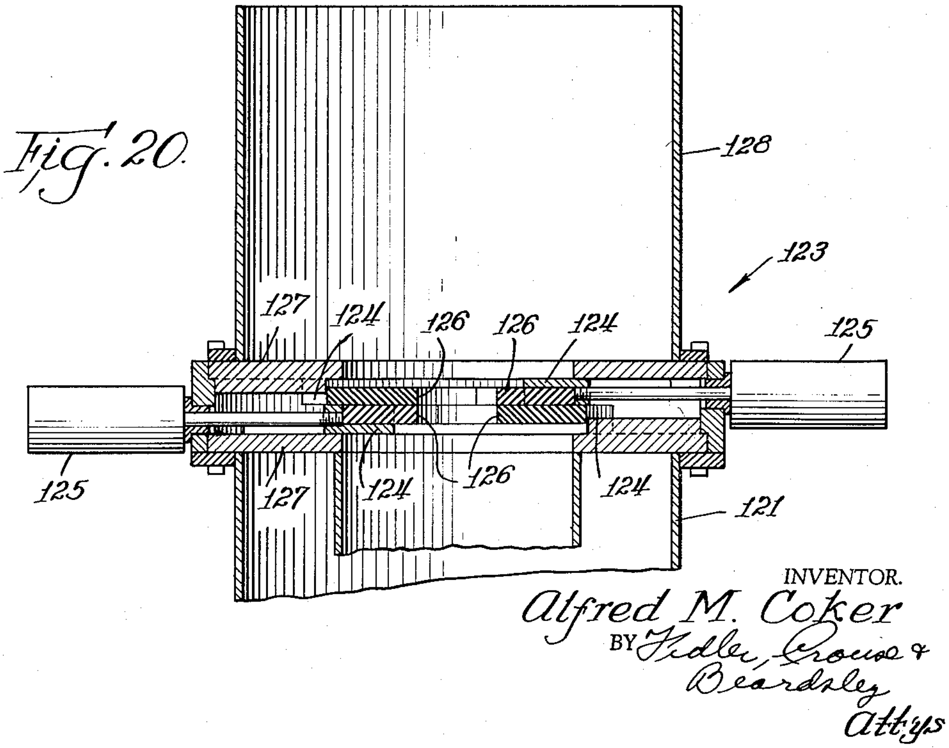

FIG. 13*a* is a schematic diagram of control apparatus for the cutoff valve shown in FIGS. 10–13;

FIG. 14 is a plan view of a drilling chamber portion of the tunnel system;

FIG. 15 is a cross-sectional view taken along the line 15—15 of FIG. 14;

FIG. 16 is a cross-sectional view taken along the line 16—16 of FIG. 15;

FIG. 17 is a cross-sectional view taken along the line 17—17 of FIG. 15;

FIG. 18 is an enlarged side view of a portion of the apparatus of FIG. 15 as viewed from the line 18—18;

FIG. 19 is an enlarged plan view of certain packing apparatus arranged within the apparatus of FIG. 18; and FIG. 20 is a cross-sectional view taken along the line 20—20 of FIG. 19.

The embodiment of the invention disclosed in the drawings is shown applied to an offshore drilling operation, to which operation the invention is well adapted. It will subsequently become apparent, however, that the invention is applicable not only to other oil field development operations in which the actual drilling must be carried on in a relatively inaccessible location, but is also applicable to development operations wherein the actual drilling may be carried on in a conventional manner in perfectly accessible sites.

The embodiment of the invention disclosed in the drawings employs a tunnel system which is arranged in large part under a body of water 30 which overlies a prospective oil field. The tunnel system includes a main shaft 31 and a main access tunnel 32, the shaft being sunk from a site adjacent the shoreline. A head frame 33 is preferably arranged above the shaft 31 such that material drawn up through the shaft, for example in a cage or elevator 34, may be raised to a high enough level that it may be dumped into a hopper, not shown in the drawings, from which it may be dumped into trucks or railroad cars. However, where necessary, the shaft might be topped by a conventional small building, there being no other surface construction indicative of the operations being carried on below. Such an arrangement might permit these operations in an area which is so zoned that the head frame 33 might be objectionable.

Leading off of the main access tunnel 32 are one or more drilling chambers 35 each of which is preferably provided with substantial headroom for drilling operations. The drilling chambers 35 may, for examle, be on the order of 100 feet long and 100 feet high. Further in accordance with the illustrated embodiment of the invention, and for reasons explained in detail below, a safety gallery 36 is arranged below each drilling chamber, each safety gallery being provided with a safety gallery access shaft 37 and a safety gallery access tunnel 38. Assuming that a plurality of drilling chambers 35 are to be provided, it is preferred that the main access tunnel 32 be kept clear. Accordingly, the drilling chambers 35 and the safety gallery access shafts 37 are arranged to one side of the main access tunnel.

As will readily be understood by those skilled in the art, the tunnels are preferably driven through a firm rock structure and accordingly would normally be located 500 feet or 1,000 feet below the ground level. Where desired, however, the tunnels may be at several times these depths.

Figure 4:
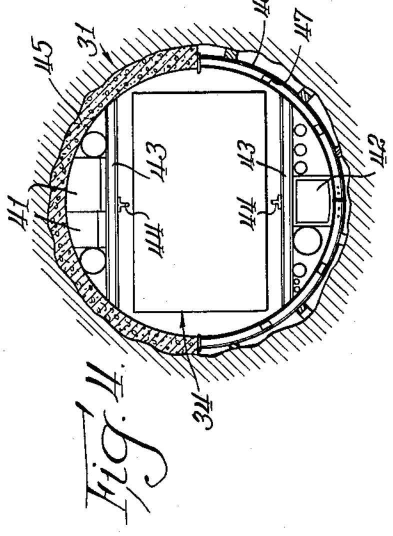
FIG. 4 is an enlarged cross-sectional view of the shaft seen in FIG. 1.

The shaft 31 is shown in detail in FIG. 4. The cage 34 occupies the major portion of the cross section of the shaft, while the remaining portions may be employed for various special purposes. At the top of FIG. 4 may be seen an emergency or safety access ladder 41. In the interest of safety, the ladder shaft is preferably staggered in a conventional manner, platforms being provided at regularly spaced levels. At the bottom of FIG. 4 an uninterrupted shaft 42 is provided through which elongated items such as pipe and rails may be lowered without the use of the cage 34. Suitable walls 43 separate the cage shaft from the safety access ladder 41 and from the pipe and rail shaft 42, and cage guides 44 are secured thereto. The remainder of the space may be employed for the requiring piping and wiring.

Two forms of construction are illustrated in Fig. 4. The upper half of the figure shows a concrete liner 45 which is recommended at levels where water is present in the ground. The lower half of FIG. 4 illustrates a framed construction employing ribs 46 and suitable interconnecting braces 47. This latter, more economical, construction is normally suitable in a firm, dry rock structure.

Figure 5:
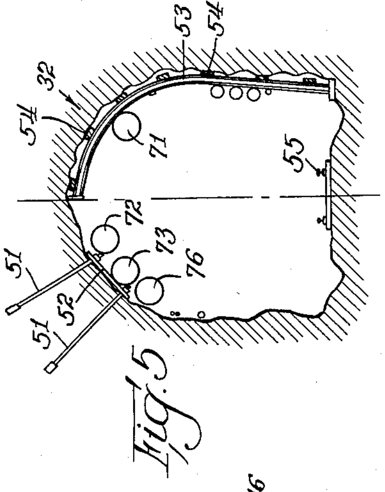

The tunnel section shown in FIG. 5 illustrates two forms of construction, the left-hand side of the figure illustrating the bare form which is permissible where a firm rock structure is being tunneled. The roof of the tunnel may, however, be reenforced by roof bolts 51 and mine ties 52, all as is well known in the art. The right-hand side of FIG. 5 illustrates a construction employed in blocky rock which is subject to tumbling. In this case a framework is employed comprising ribs 53 and suitable ties or cross-framing 54. On the floor of the tunnel tracks 55 are laid in a conventional manner. The function of the various conduits shown in FIGS. 5 and 6 are described below.

Figure 6:
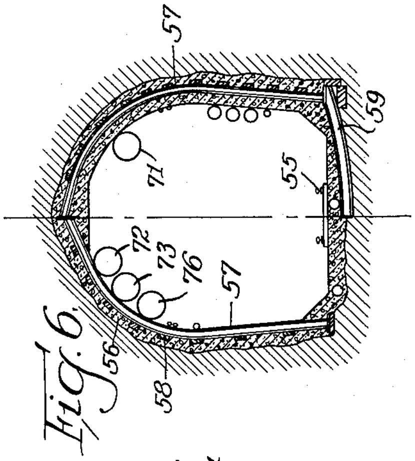
FIGS. 5 and 6 are enlarged cross-sectional views of the tunnel seen in FIG. 1 and illustrating various reenforcing systems.

FIG. 6 illustrates two other forms of tunnel reenforcement. The construction illustrated at the left-hand side of FIG. 6 is recommended for faulted zones where water under pressure is or may be encountered. This construction employs a concrete liner 56 with reenforcing ribs 57 and cross-braces 58. The construction shown at the right-hand side of FIG. 6 is similar except that the ribs 57 are set deep in a thicker concrete lining, and spreaders 59 are employed which extend from side to side across the bottom of the tunnel to brace the individual ribs 57. This latter construction is recommended where the tunnel passes through what is known as squeezing rock, that is, rock which is under such pressure that it tends to squeeze into the tunnel. It is to be understood that any or all of the suggested tunnel constructions, or any other suitable forms, may be employed according to the type of rock structure encountered, all as is well understood in the art.

Figure 7:
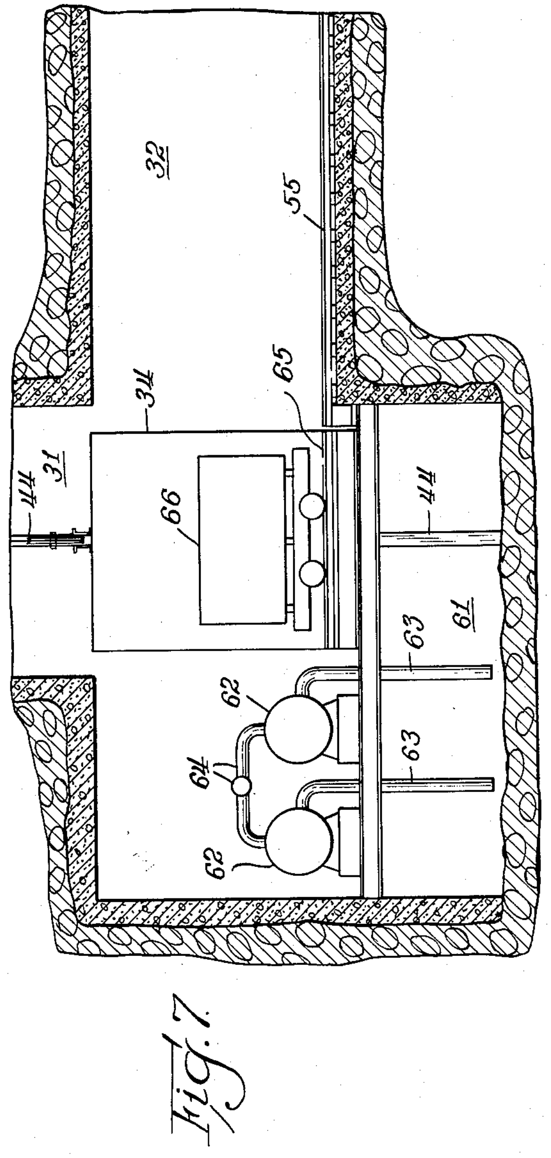
FIG. 7 is an enlarged cross-sectional view of the bottom of the shaft seen in FIG. 1.

At the bottom of the shaft 31 a sump 61 is provided, as shown in FIG. 7, for collecting water which may seep into the tunnel system. A pair of sump pumps 62 are shown, one being intended for regular use and the other serving as a standby. These pumps are arranged to raise the sump water through open-ended pipes 63 and to pump the water through suitable piping 64, shown in part in FIG. 7, and up through the shaft 31 to the surface.

The cage 34 has rails 65 mounted on its floor which are arranged to align with the tracks 55 when the cage is lowered to the bottom of the shaft. A typical car 66, known as a muck car, is shown in the cage in FIG. 7, which car may be employed to transport materials through the shaft and tunnel system.

Figure 8:
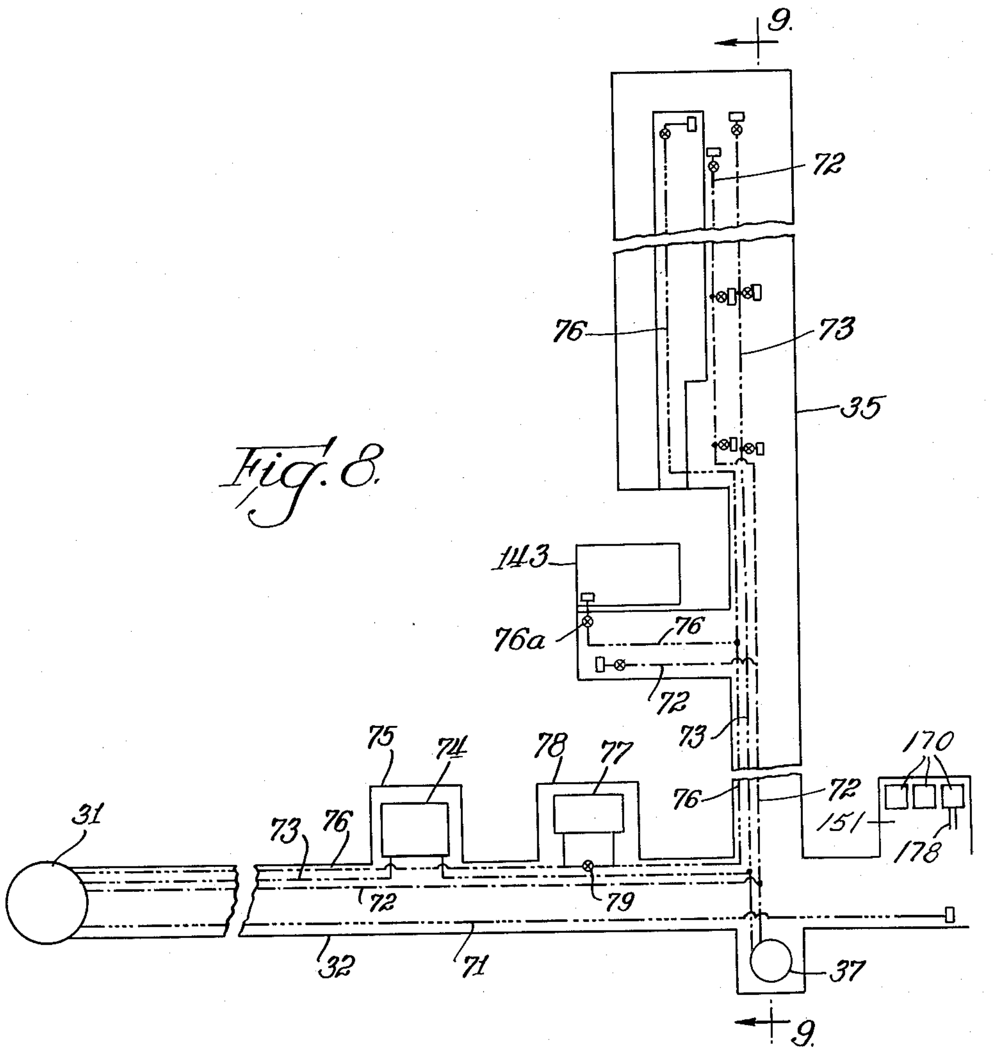
FIG. 8 is a schematic plan view of a portion of the tunnel system of FIG. 2 illustrating a suggested arrangement of tunnel ventilating apparatus.
Figure 9:
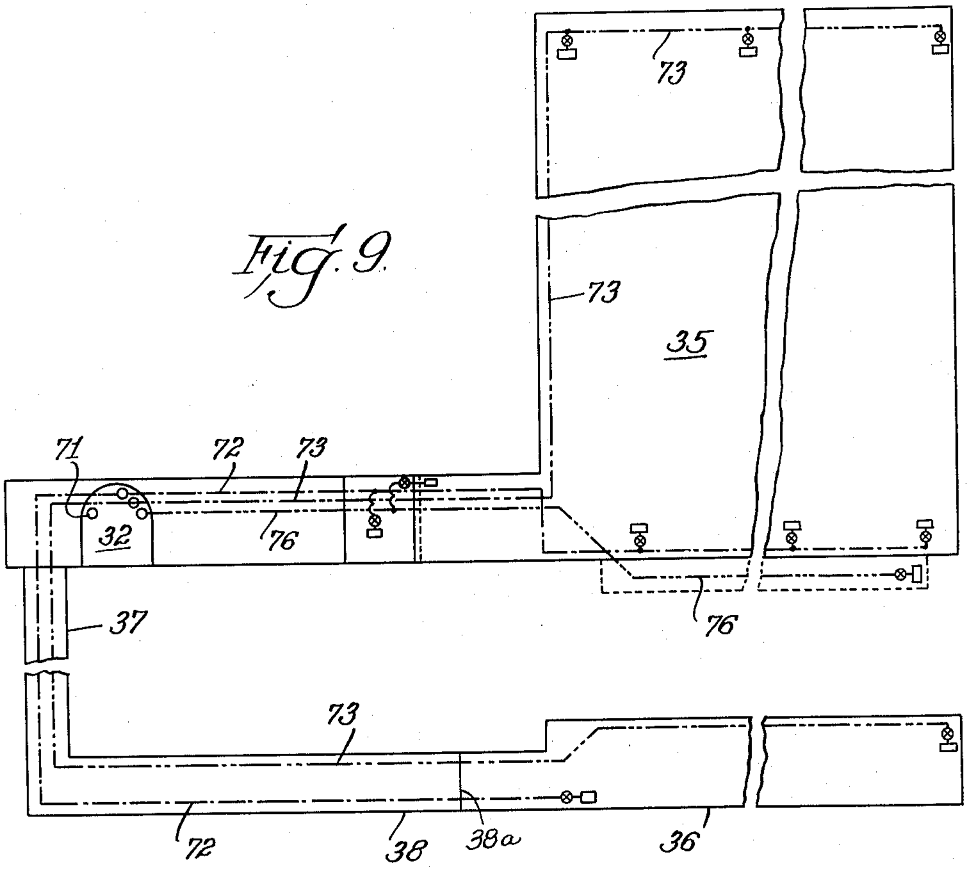
FIG. 9 is a schematic elevation taken along the line 9—9 of FIG. 8 and further illustrating the tunnel ventilating apparatus.

A suitable ventilation arrangement is illustrated in FIGS. 8 and 9. In FIG. 8 a pipe 71 is employed to carry fresh air to the forward end of the main access tunnel 32 for the benefit of the workers who are driving the tunnel farther forward. A pipe 72 serves to carry fresh air into the drilling chamber 35 and into a corridor leading to a drill mud chamber, described below. A third pipe 73 serves to carry exhaust air from the drilling chamber 35 back to the surface. A blower 74 arranged in a small cubicle 75 produces the desired flow of exhaust air therethrough. Suitable inlet or outlet ports are, of course, provided at various points in these lines as desired.

A fourth pipe 76 serves to exhaust gases which may be carried up from the drill holes by the drill mud all as described in detail below. A blower 77 is provided to produce the required exhaust, this being housed in a cubicle 78. Since the blower 77 is preferably of substantial capacity in order to handle abnormal conditions, and since there would ordinarily be a relatively small flow of exhaust gas, a valve 79, preferably of the butterfly type, is arranged to bypass gas or air from the output of the pump 77 to its intake. This valve may respond automatically to pressure drop thereacross whereby it will open when the pressure drop is great, as in the case of a small flow of exhaust gas, and will close when the pressure drop is small, as when there is a substantial flow of gas to be exhausted.

This piping arrangement may also be seen in FIG. 9. In particular, it may there be noted that the pipe 72 which carries fresh air to the drilling chamber also extends down through the safety gallery access shaft 37 and into the safety gallery to supply fresh air thereto. The exhaust line 73 also may be seen to extend down into the safety gallery.

The general tunnel system has now been described in sufficient detail to permit those skilled in the art to produce such a tunnel system either in accordance with the specific embodiment disclosed or modified to suit given conditions. As has already been indicated, the shaft 31 should extend downwardly into a suitable rock formation for the best working conditions. Furthermore the shaft may be sunk, if desired, to a greater depth in order to reduce the require depth of drilling to reach a given deposit of oil, gas, or other hydrocarbons. Various forms of shaft and tunnel construction have been disclosed which may be used, along with other known constructions, depending upon the form of rock structure encountered.

The size of the main shaft and the main tunnel should be sufficient, of course, to permit convenient passage therethrough of the largest pieces of equipment which may be required within the tunnel system. Some of the bulkiest items may be the various blowers and the hoist for the drill rig. Other items which must be considered in designing the size of the tunnel system, particularly at right angle turns therein, are the relatively long thin items such as pipe, rails and structural members. The headroom in the drilling chambers 35 may be made relatively high or relatively low depending upon the cost of providing additional headroom as against the cost of drilling the desired number of wells with relatively small headroom. As explained above, the drilling chambers are preferably offset from the main access tunnel 32 in order to permit free passage through this tunnel. This of course is particularly desirable if the tunnel is to lead to more than one drilling chamber. It is contemplated that a tunnel system for an extensive oil field might involve a dozen or more drilling chambers connected by a main access tunnel, the length of which may be several miles. In order to provide greater coverage of a substantial oil field it may be desirable to locate the drilling chambers at a substantial distance laterally of the main access tunnel, lateral access tunnels of substantial length being provided for the individual drilling chambers.

As previously indicated, one of the major problems in drilling oil wells from a tunnel system is that of protecting against danger resulting from the development of dangerous gas conditions. Small percentages of gas in the tunnel system produce an explosive atmosphere, and excessive gas pressure in the drill hole may produce a blowout. One important feature of the present invention is the provision of a safety cutoff valve 80 located in the safety gallery 36, as best seen in FIGS. 10–13. This cutoff valve serves to close a conductor pipe 81 which is sunk from the corresponding drilling chamber 35 through the intervening rock and entirely through the safety gallery 36. This conductor pipe is firmly cemented in place such that it may not be dislodged by the highest fluid pressures which may be encountered in drilling. The conductor pipe is furthermore sufficiently strong to resist bursting when such high fluid pressures are encountered. As is well understood in the art, the fluids under pressure which may be encountered are primarily gas, oil and water.

The cutoff valve 80 is arranged to close the conductor pipe 81 in response to the development of any one of several dangerous gas conditions as described below. The fact that this cutoff is made in the safety gallery 36, which is preferably 50 to 100 feet below the drilling chamber, is a substantial safety factor in the specific embodiment of the invention disclosed. In accordance with this arrangement the conductor pipe is closed at a point well removed from those areas occupied by workers. If the conductor pipe should burst as a result of unexpectedly high pressures after the cutoff valve has been closed, it will of course burst below the cutoff valve and the damage would be confined to the safety gallery 36 where workers are not normally present. Suitable means are provided for isolating the safety gallery from the remainder of the tunnel system. These may be in the form of a bulkhead **38*a* in the tunnel 38, as shown, or in the shaft 37**. Since workers are not normally in the safety gallery, such a bulkhead can be kept closed normally.

Since dangerous gas conditions will normally develop during actual drilling operations, the cutoff valve is designed to close the conductor pipe 81 even though drill pipe may be located therein. More specifically, a valve plate 82 is provided with tool steel inserts 83 facing the opening therethrough. Matching tool steel inserts 84 are also arranged in the valve body 85 such that the cooperating tool steel inserts may serve to shear off the drill pipe and permit the cutoff valve to close.

It will be apparent that a substantial force is required to close the cutoff valve in the event that drill pipe is present within the conductor pipe 81. For this reason the valve plate is preferably operated by a hydraulic mechanism including a piston 86, a cylinder 87, and a piston rod 88. A liquid, preferably water, may be forced into the cylinder 87 under pressure through a port 89 to drive the piston and the piston rod to the left in FIGS. 11 and 12, and thereby to close the valve. In order to supply the very high pressure required to operate the cutoff valve 80 in the event that drill pipe should be present within the conductor pipe 81, suitable accumulator apparatus is preferably provided which has sufficient energy stored therein to cause operation of the cutoff valve even in the event of a power failure. Since the accumulator apparatus and the control apparatus therefor may be of any of various well-known forms and does not of itself constitute a feature of the present invention, it is not disclosed in the drawings nor described in detail herein. It is believed sufficient for the purpose of describing the present invention to point out that the stored energy may, for example, be in the form of compressed springs, a rotating flywheel, or an elevated dead weight. One form of accumulator apparatus which is known in the art and which is recommended is a hydraulic system having a piston and cylinder on a vertical axis, the piston supporting a large dead weight. The potential energy of the elevated weight constitutes the stored energy for operating the cutoff valve even in the event of a power failure. Water or other hydraulic liquid which leaks out of the system should, of course, by replaced by periodical operation of a small automatic pump, responsive to downward movement of the dead weight. The immediate control apparatus for the hydraulic system may include a pilot valve 90 in the high pressure pipe line leading to the cylinder 87. Because of the high pressures necessarily employed, the pilot valve should be of the balanced type. When the pilot valve is operated, the water, or other suitable liquid, acting under the pressure of the elevated weight, may flow into the cylinder 87 and drive the piston 86 to the left to close the cutoff valve.

Figure 10:
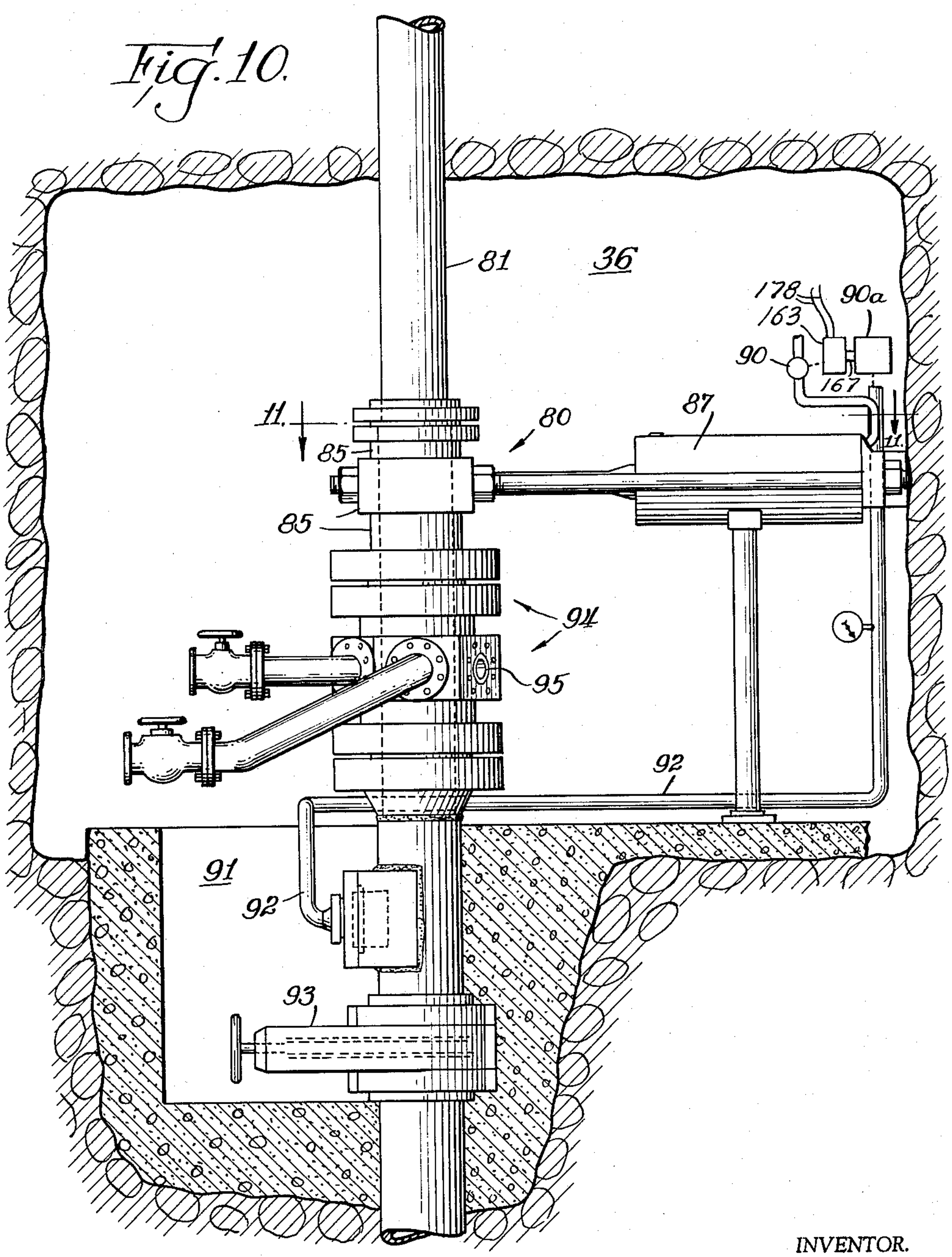
FIG. 10 is an enlarged elevational view taken along the line 10—10 of FIG. 3 and illustrating a portion of the tunnel system and apparatus arranged therein.
Figure 11:
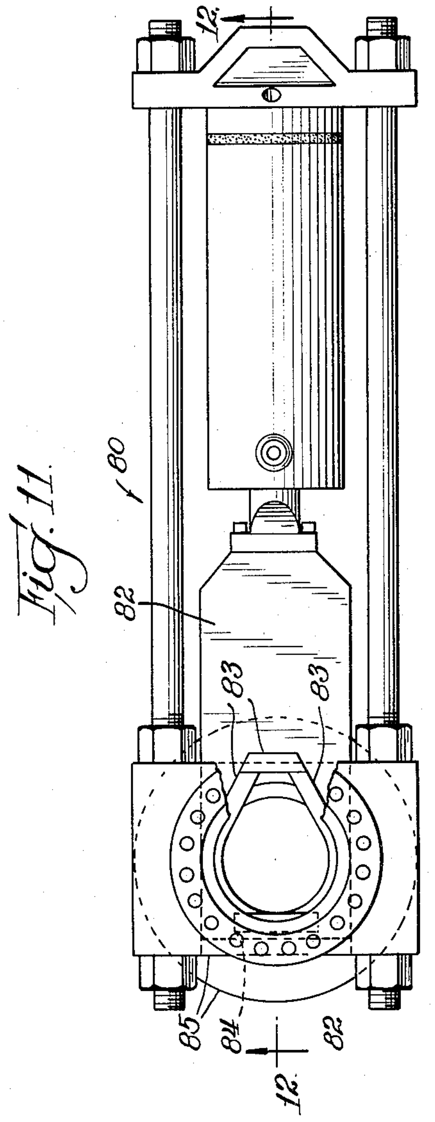
FIG. 11 is a further enlarged plan view of a portion of the apparatus shown in FIG. 10, taken along the line 11—11 of FIG. 10.
Figure 12:
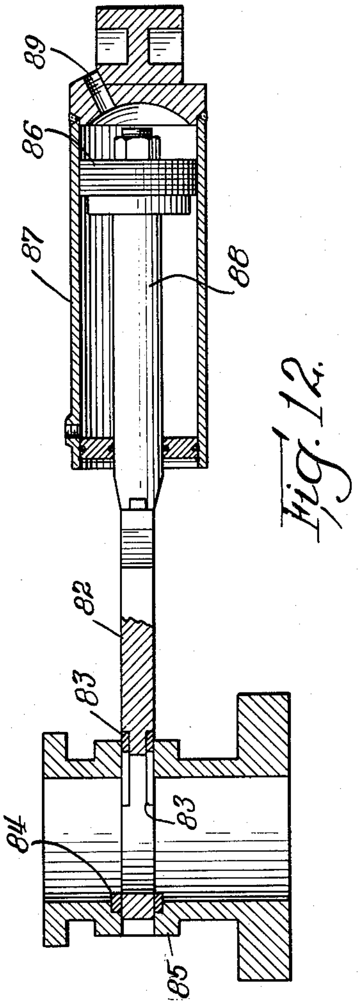
FIG. 12 is a cross-sectional view taken along the line 12—12 of FIG. 11.

The pilot valve 90 may in turn be under the influence of various control devices responsive to those conditions which warrant the closing of the cutoff valve. One such condition is the presence of excessive pressure in the conductor pipe, which is indicative of an imminent blowout. In order to make the cutoff valve responsive to such a condition, the conductor pipe 81 may be tapped, as shown in FIG. 10, preferably in an open pit 91. A pipe 92 leads from the tapped connection on the conductor pipe 81 to any suitable control apparatus, shown schematically at 90*a*, for operating the pilot valve and hence the cutoff valve 80 in response to excessive pressures within the conductor pipe 81. Accordingly as the drilling proceeds, if a high pressure pocket of gas, oil or water is struck, with the result that pressure is built up within the conductor pipe 81 faster than it can be relieved, the pressure acts through the pipe 92 to actuate control apparatus 90*a* and the pilot valve 90 to release hydraulic liquid under high pressure into the cylinder 87. This effects closing of the cutoff valve 80 even though drill pipe is present within the conductor pipe and in particular in the path of the valve plate 82.

As indicated above both the accumulator apparatus and the control apparatus therefor may be of conventional design and, since it does not of itself constitute a feature of the present invention, no particular form of such apparatus is disclosed in detail herein. Shown in the drawings, however, it that portion of the control means, namely the tapped connection 92, which is peculiar to the present application of such accumulator and control apparatus.

Also arranged within the open pit 91 is a valve 93 which may be manually operated or motor operated. This valve is conventional in design and is intended for use primarily under normal operating conditions.

Immediately below the cutoff valve 80 is a device 94 which is referred to herein as a blowoff manifold. In the specific embodiment disclosed, this device is hexagonal, there being six ports 95, one on each face of the device. Any desired number of these ports may be connected to a single pipe of substantial diameter for carrying off, under special conditions, gas, oil, water, drill mud, or any combination of materials which may be present in the conductor pipe 81. If, during drilling operations, a high-pressure pocket is struck, and pressure begins to build up within the conductor pipe 81, and the cutoff valve 80 is thereby caused to close, the manifold 94 may be employed to bleed off the pressurized material such that normal pressure might again be obtained. This would permit reopening of the cutoff valve 80 and the resumption of drilling.

Under the same conditions it might be found that a large field of pressurized gas or oil has been struck. In such case the cutoff valve 80 may be left closed, and controlled flow of the gas or oil may be permitted through the blowoff manifold for as long a time as the gas or oil flows under its own pressure.

It is recommended that at least one of the ports 95 be available for special operations such as washing or rodding to clear any obstacles within the conductor pipe or the manifold. It will of course be understood that all of the ports 95 should normally be closed or controlled by valves of different sizes, as indicated in FIG. 10. It will be seen that the body 85 of the cutoff valve 80, and the entire blowoff manifold 94, as installed, constitute continuations of the conductor pipe 81.

An important safety feature for the drilling of wells from a tunnel system has now been described. In accordance with this feature of the invention, the development of excessive pressure within the drill hole, as may frequently result from striking a high-pressure pocket, causes the closing of the conductor pipe by the cutoff valve 80, this operation being effected automatically and in spite of a power failure and in spite of the presence of a drill pipe within the conductor pipe 81. This operation occurs in the safety gallery 36 which is remote from the working level and separated therefrom by many feet of rock. The operation occurs in an area where workers are not normally present and where they should not be present when drilling is in progress. The control of the cutoff valve 80 may also be responsive to the development of other dangerous gas conditions such as the presence of a dangerous percentage of gas in the tunnel system or an abnormal percentage of gas carried into the drilling chamber by the drill mud. The application of these additional controls for the cutoff valve is described in greater detail below.

Figure 3:
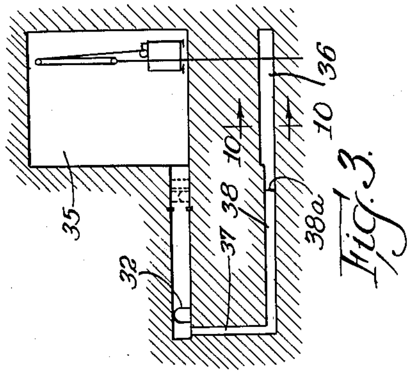
FIG. 3 is a schematic elevation taken along the line 3—3 of FIG. 2.
Figure 1:
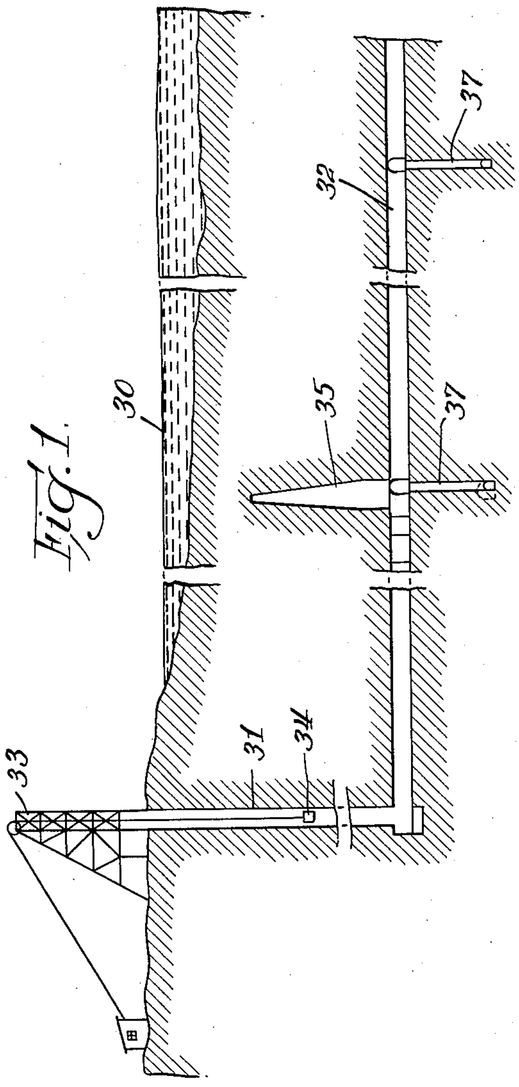
FIGURE 1 is a schematic elevation of a tunnel system illustrating one embodiment of the invention.
Figure 2:
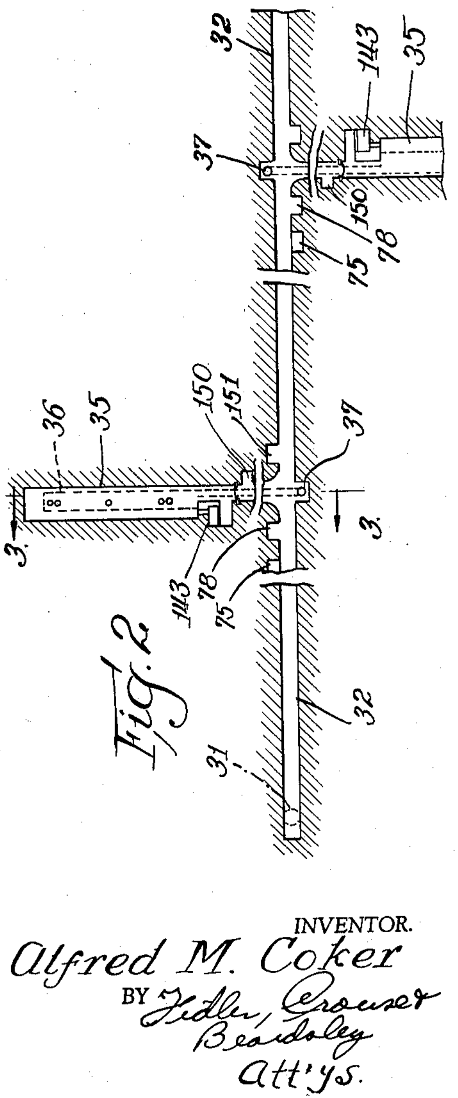
FIG. 2 is a schematic plan view of the same tunnel system.

Certain special apparatus is also employed in the drilling chamber 35 to permit the employment of certain safety features which are believed to be of great importance, if not essential, to the drilling of wells from a tunnel system. This special apparatus while permitting the employment of these safety features, provides at the same time a high level of convenience and efficiency in the drilling of the wells. The elongated drilling chamber 35, seen in large scale in FIG. 14, is oriented substantially perpendicular to the main access tunnel 32 as may be seen in FIG. 2. The tracks 55 will extend along the main access tunnel 32 also extend into the drilling chamber 35, a turntable similar to the turntable 101, shown in FIG. 14, being provided at the juncture of the drilling chamber and the main access tunnel. This permits convenient movement of various forms of cars along the main access tunnel and into the various drilling chambers 35.

Arranged alongside the tracks 55 within the drilling chamber proper are other heavier tracks 102 which support a device 103 known in the art as a drill jumbo and another device 104 known in the art as a pipe jumbo. It will be noted that the tracks 102 are widely spaced in order to provide stability for the drill jumbo 103 and the pipe jumbo 104. These tracks permit convenient movement of the jumboes along the length of the drilling chamber 35 to drill successive wells in one drilling chamber. In FIG. 14 the positions of twenty wells or prospective wells 105 are suggested. These wells, while being relatively closely spaced at their heads, may be spread over a wide area at their lower ends. This result may be achieved by a process well known in the art and commonly termed "whipstocking." By this process wells may be drilled at various angles to the vertical and in various directions such that a substantial area of an oil field may be reached from a given drilling chamber 35. Since this process is well known in the art, it is not further described herein.

The drill jumbo 103 may be on the order of 20 feet high, and, because of its size, is assembled within the drilling chamber. Mounted on the top of the drill jumbo is a hoist 106 for raising and lowering drill pipe and various drilling equipment. The hoisting equipment also includes necessary cables 107 and pulleys or blocks 108. Also mounted on the top of the drill jumbo 103 is a device 109 known in the art as a Kelly table. The Kelly table is power driven and serves to rotate a Kelly which, as is well known in the art, comprises a rod of square cross section and with an axial hole extending therethrough. This fits slidably in a square opening in the Kelly table 109 such that the Kelly table may cause rotation of the Kelly. Drill pipe 111 is secured to the bottom of the Kelly and carries a suitable drill bit at its lower end. As drilling proceeds, the Kelly slides down through the Kelly table and continues to be rotated thereby.

In ordinary drilling practice the Kelly table 109 can be located substantially at ground level, the lower end of the Kelly being arranged immediately below the Kelly table at the start of a drilling operation and extending well down into the drill hole when the upper end of the Kelly approaches the level of the Kelly table. The Kelly is then released from the drill pipe and is withdrawn so that an additional length of drill pipe may be lowered into the drill hole and fastened to the preceding length of drill pipe. The Kelly is then fastened to the upper end of the newly added drill pipe and the drilling operation may be resumed.

In the present instance, however, it is desired that a packing be provided between the drilling apparatus and the surrounding conductor pipe 81 for reasons subsequently to be explained. Such packing may be much more conveniently applied to the drill pipe, which is circular in cross section, than to the Kelly, which is square. Accordingly, it is preferred that the lower end of the Kelly be kept at all times above the packing, which is arranged at the upper end of the conductor pipe. For this reason the Kelly table 109 is arranged at the top of the drill jumbo 103, some 20 feet above the upper end of the conductor pipe 81. A Kelly some 20 feet in length may then be employed, the individual sections of drill pipe being on the same order of length.

In accordance with this arrangement an individual drilling operation commences with the lower end of the Kelly immediately below the Kelly table and continues until the lower end of the Kelly is immediately above the upper end of the conductor pipe 81. The Kelly is then raised and an additional length of drill pipe is secured to the upper end of the preceding drill pipe, the Kelly is secured to the upper end of the newly added length of drill pipe, and drilling may be resumed. The previously-mentioned packing at the upper end of the conductor pipe is therefore in engagement at all times with round drill pipe and never with the square Kelly. Alternatively, a well known packing which seals around the Kelly may be employed, whereby a lesser Kelly table height is practical. Details of the hoisting apparatus, the Kelly table, and its driving apparatus are not disclosed in the drawing nor described herein since this apparatus may be conventional and is well known in the art.

As has previously been indicated the drilling chamber 35 may be excavated to a height on the order of 100 feet. It will be apparent from the above that a drilling chamber height on the order of 50 feet would be sufficient for the purpose of actual drilling operations. However, as is well known in the art, additional height is desired to permit rapid removal of drill pipe from the drill hole in order to replace the drill bit. Where extra headroom is provided the drill pipe may be removed three or four lengths at a time and may be reinserted into the drill hole in the same manner. Where the drill pipe may be handled three lengths at a time, this frequently recurring operation may be performed substantially three times as fast as would be possible if the drill pipe had to be removed and inserted one length at a time. It is for this reason that additional headroom is preferably provided.

It is necessary that one of the blocks 108 be arranged at the top of the drilling chamber 35, as shown in FIG. 16. Conventionally this block, known as the crown block, is supported by rigging built primarily for this purpose. In an excavated drilling chamber, however, supporting structure is already present and may be used to advantage, the block 108 being secured to the roof of the excavation. Structural members 112 seen in FIGS. 15 and 16 are merely support steel for lining the walls of the drilling chamber 35 as may be required by the nature of the rock structure. While this support steel may be used to advantage in supporting ladders, platforms, and the upper block 108, it is not essential either to the drilling operations or to the supporting of the chamber walls and ceiling except as may be required by the nature of the rock structure.

The pipe jumbo 104 serves primarily as a convenient carrier and storage rack for drill pipe which is to be employed in the drilling operations. A convenient trolley hoist 113 is preferably provided to remove pipe from cars operating on the tracks 55 and to place it on the pipe jumbo 104, all as suggested, in FIG. 17.

In well drilling, the rock cuttings resulting from rotation of the drill bit at the bottom end of the drill pipe are floated to the surface by the pumping of a viscous fluid down through the kelly and the drill pipe, this fluid rising through the drill hole and the conductor pipe 81, outside the drill pipe, to the surface, and carrying the rock cuttings with it. The viscous fluid employed for this purpose is commonly termed "drill mud." The drill mud may serve various purposes other than the mere flotation of the rock cuttings through the top of the drill hole and the drill mud may contain various ingredients which serve to improve its performance of these various functions. The present invention is not directly concerned with the constitution of the drill mud, and since numerous varieties of drill mud with their various constituents and formulae are well known in the art, no particular formula for drill mud is specified herein.

It will be understood that under normal drilling conditions, the entire drill hole, both inside and outside the drill pipe, is filled with drill mud, the drill mud within the drill pipe moving downwardly and the drill mud outside the drill pipe moving upwardly, carrying the rock cuttings therewith. A pipe 115 may be seen in FIGS. 14, 15 and 16 for carrying drill mud under pressure to the wellhead. When the drill pipe 111, which is shown in FIGS. 15 and 16 being lowered into the drill hole, is topped by a kelly for further drilling, the upper end of the pipe 115 is connected to the top of the kelly by a flexible hose. The drill mud is accordingly piped under pressure upwardly through the pipe 115 and through the flexible hose, down through the kelly and the drill pipe 111, and back up within the drill hole outside the drill pipe. The rising drill mud carries upwardly not only the rock cuttings but also any gas which may seep into the drill hole against the hydrostatic pressure of the drill mud. It is quite common in oil well drilling to find a substantial quantity of gas such as methane in the returned drill mud.

In conventional surface drilling, the returned drill mud may be allowed to run into an open ditch and is passed over suitable shaker screens or other similar devices for screening out the rock cuttings, the rock cuttings being rejected and the drill mud being returned to the well for re-use. During the time that the drill mud lies in the open ditch and particularly when it is being screened, most of the gas which may be entrained therein escapes from the drill mud into the atmosphere.

Another important, if not essential, safety feature for drilling wells from a tunnel system is the safe removal of dangerous gases, for example, methane, which are brought to the surface by the drill mud. It will be apparent that if the drill mud were handled within a tunnel system in the same manner as it is conventionally handled in surface drilling, relatively small quantities of gas brought to the wellhead by the drill mud would accumulate to produce dangerous gas conditions within the tunnel system unless an excessive and impractical quantity of ventilating air were employed. More specifically, a gas concentration on the order of 2% approaches a dangerous mixture, subject to explosion upon being exposed to a spark. The safety feature referred to immediately above involves a complete mud handling system which is substantially hermetically sealed.

As has already been indicated, the drill mud is pumped up through the pipe 115 and a suitable flexible hose and down through the kelly and the drill pipe, and back up the drill hole outside the drill pipe to the head of the well. Reference is now made to FIG. 18 which is an enlarged view of the wellhead. The conductor pipe 81 may there be seen to extend up through the rock into a trench 120, which may be seen in FIG. 14 to extend through a major portion of the length of the drilling chamber 35. More particularly, a wide portion of the trench extends along the entire length of the drilling area and a narrower section extends farther to the left in FIG.

14. The wide portion of the trench 120 is preferably on the order of 6 to 8 feet wide and 4 feet deep, its principal purpose being to permit the apparatus of FIG. 18 to be located primarily below the general floor level, thereby to increase the effective height of the drill jumbo 103 and the effective headroom in the drilling chamber.

Arranged immediately above the conductor pipe proper is a larger conduit 121 which is, in effect, and which is considered herein as, a continuation of and a part of the conductor pipe 81. The conduit 121 provides a larger path for the return flow of drill mud from the drill hole, such that the drill mud may move more slowly and such that the level of the drill mud therein may be more readily controlled. The drill mud is drawn off through a conduit 122 which extends along the trench 120 to a mud room described below.

In order that this portion of the mud circulating system may be substantially hermetically sealed, a packing 123, best seen in FIGS. 19 and 20, is provided at the top of the conduit 121. The purpose of this packing is to provide an effective seal between the conductor pipe (i.e., its enlarged extension 121) and the drill pipe 111 which extends down through the packing and through the conductor pipe. A suitable form of packing is disclosed in FIGS. 19 and 20. In FIG. 19 three metal plates 124 may be seen secured to suitable hydraulic operating means 125, the latter serving to move the plates radially toward and away from the drill pipe 111. Secured to the inner edge of each of the plates 124 is a sheet 126 of soft resilient material having an arcuate face to receive the outer surface of the drill pipe 111. The three resilient sheets or plates 126 are otherwise shaped such that their edges abut each other when their arcuate faces contact the drill pipe. These three mating leaves provide a seal of considerable effectiveness. However, a second, like set of packing members is arranged immediately therebelow, the lower set being circumferentially displaced through an angle of 60°. Accordingly, the individual elements or leaves of the lower packing unit underlie the joints between the individual leaves of the upper packing element. The second packing unit not only provides a second seal around the drill pipe 111 but also aids in sealing the joints between the three elements or leaves of the first packing unit.

As may be seen best in FIG. 20, the metal plates 124 of the upper and lower packing units fit closely between upper and lower guide plates 127, and that the resilient sheets 126 of the upper and lower packing units are arranged to bear against each other, all of which serves to provide a more effective seal. In order to provide a still more effective seal, a container 128 is arranged above the packing 123, which container may be filled with drill mud. It will be apparent that this viscous fluid will further retard the escape of gas through the packing or the passage of air from the tunnel atmosphere through the packing and into the conductor pipe.

In order that the packing 123 may be opened and closed as infrequently as possible, the drill pipe is preferably of that form, common in the art, which provides a substantially flush or continuous outer surface at its joints. In such case the only time that the packing 123 need be opened is during the time that drill pipe is being raised and lowered in a drill bit replacing operation. Opening of the packing during this operation eliminates the excessive and unnecessary wear of the plates 126 which would otherwise occur. It should be noted that substantial gas pressure is likely to be encountered only during actual drilling and that relatively little gas escapement can be expected at other times. It should be noted further that any drill mud which seeps through the packing during drilling operations is of no consequence since it merely falls into the body of drill mud which is being circulated.

The space above the drill mud within the conduit 121 is preferably subjected to a slight vacuum in order that any leakage through the packing 123 will be in the form of air leaking in rather than gas leaking out. Accordingly, the conduit 121 is tapped as shown in FIG. 18 substantially above the conduit 122. A conduit 130 connects the upper portion of the conduit 121 to a baffle chamber 131 and another conduit 76, previously described, leads to the upper portion of this baffle chamber. The conduit 76, seen in FIG. 8, leads to the blower 77 which serves to exhaust such gases to the surface.

Various devices are preferably employed for preventing the movement of any drill mud into the conduit 76 since the blower 77 might be damaged by even a small amount of drill mud. A first baffle 132 is provided within the conduit 121. This baffle may be in the form of a plate in front of the conduit 130 but is preferably in the form of a short length of conduit, as shown. This directs any drill mud, which passes through the packing 123, down past the conduit 130 such that the drill mud is encouraged to fall into the circulating drill mud rather than being sucked into the conduit 130. A baffle plate 133 is also arranged within the baffle chamber 131 in front of the conduit 130 whereby any drill mud which may be carried through the conduit 130 is halted such that it will tend to drop to the bottom of the baffle chamber. Still another baffle 134 is supported below the conduit 76 within the baffle chamber by a plurality of rods 135. A clean-out plate or door 136 is also provided in the baffle chamber through which any drill mud which becomes lodged in the baffle chamber may be removed.

The drill mud is drawn through the conduit 122 by a mud pump 140 seen in FIGS. 14 and 15. This pump drives the drill mud through a conduit 141 into a mud room 142 where it falls onto conventional shaker screen apparatus 143. The mud falls through the screens to the floor of the mud room while the rock cuttings are retained by the screen and are shaken into a hopper 144. The drill mud is drawn from the mud room through a conduit 145 seen in FIG. 14 by a main mud pump 146 which pumps the drill mud through the conduit 115 previously described. The rock cuttings are withdrawn from the bottom of the hopper 144 by a screw 147 and are dropped into a muck car 66.

The mud chamber is sealed by a substantially airtight door 148 whereby the mud room, like all other portions of the drill mud handling system, is substantially hermetically sealed. The gas exhaust pipe 76 previously described serves to exhaust gases from the mud room 143 which escape from the drill mud, as may be seen best in FIG. 8. A valve 76*a* may there be seen immediately outside the mud room to relieve the vacuum in the mud room in order that the door 148 may be opened to provide access to the mud room. Normally, sufficient mud will be present with the rock cuttings in the hopper 144 to provide an effective seal within the screw 147 which removes the rock cuttings from the mud room.

It will be noted in FIG. 14 that the tracks 55 extend into the short corridor alongside the mud room such that the muck car 66 may readily be brought into the corridor and positioned below the screw 147. The turntable 101, also seen in FIG. 14, permits convenient handling of the muck car.

Also seen at the left-hand end of FIG. 14 is a room 150 for containing the accumulator which serves to operate the cutoff valve 80. Suitable high-pressure piping connects the accumulator to the cut-off valve, this piping extending either through the tunnel system described, or through a small hole drilled for this purpose from the accumulator room 150 to the safety gallery 36.

A safety control chamber 151 (FIG. 2) is preferably provided for each drilling chamber to house portions of the desired detecting and control apparatus. This preferably includes apparatus sensitive to the presence of gas in the tunnel atmosphere, and is operatively connected to the pilot valve control apparatus 90*a* of FIG. 10. In accordance with this feature of the invention the cutoff valve 80 is caused to close in response to the development of a dangerous gas concentration in the tunnel. The actual gas responsive apparatus and the associated control apparatus are readily available on the open market and are described briefly below.

Also included in the safety control apparatus, portions of which are housed in the chamber 151, is apparatus responsive to the development of dangerous gas conditions within the sealed drill mud system, including the mud room 134. The actual gas sensing element may be arranged at any desired point within the drill mud system or in the exhaust line. Since excess gas within the system is indicative of possible blowout conditions it is desired that it cause closing of the cutoff valve 80 through the control apparatus 90*a*. Detecting and control apparatus suitable for the purpose is readily available on the market.

Suitable apparatus for operating and controlling the cutoff valve 80 is illustrated diagrammatically in FIG. 13*a*. The operating cylinder 87 for the cutoff valve is shown in part at the lower right-hand corner of the figure. An accumulator 160, previously referred to, is connected through a pipe 161 to the valve 90. If the accumulator is located in the upper tunnel system, for example, in the room 150, the pipe 161 must extend through the tunnel system or through a drilled hole to the safety gallery, as previously indicated.

The valve 90 illustrated in FIG. 13*a* is a slide valve and is balanced, i.e., the fluid pressure applied thereto does not tend to open or close the valve, both ends of the valve body being open to drain into a sump tank 162.

When the valve 90 is opened, by operation of a solenoid 163, the high pressure fluid may pass from the accumulator to the cylinder 87 to close the cutoff valve 80. When the cutoff valve is to be reopened, the valve 90 is closed and a valve 164 is opened to allow fluid to drain from the cylinder 87 into the sump tank 162. A pump 165 is provided to build up and maintain the desired pressure or energy level in the accumulator.

The previously mentioned control device 90*a* may be employed to cause closing of the cutoff valve 80 in response to an abnormally high pressure in the conductor pipe. The device 90*a* may be a simple pressure operated switch, readily available on the market. In response to abnormal pressure in the pipe 92 it closes contacts between power terminals 166 and wires 167 leading to the solenoid 163. Operation of the pressure switch 90*a* thereby causes opening of the pilot valve 90 and closing of the cutoff valve 80.

In the upper left hand portion of FIG. 13*a* there is illustrated conventional control apparatus 170 responsive to the existence of a near explosive concentration of gas at a selected point in the tunnel system. This apparatus may be located within the control rooms 151 as previously indicated. A Wheatstone bridge employs two resistors 171 and 172 and two gas detectors 173 and 174 in its four legs. The detector 173 has associated therewith a compressor 175 which continuously draws sample atmosphere through the detector 173 from a sample inlet 176, the latter being located at a suitable point, such as within the associated drilling chamber 35.

D.C. power is applied to terminals 177 and heats filaments 173*a* and 174*a* within the detectors. The heated filament 173*a* continuously burns any gas within the detector 173, and as the gas concentration increases the filament becomes hotter and its temperature increases. This upsets the balance of the bridge and causes current flow through leads 178 to the solenoid 163 to open the pilot valve 90 and to close the cutoff valve 80. The detector 174 is employed to compensate for the detector 173 and balance the bridge under normal conditions. Preferably, the gas detection apparatus 171—176 is duplicated to permit sampling of atmosphere at a large number of spaced apart points within the tunnel system.

All of the operating and control apparatus shown in FIG. 13*a* is of itself conventional and well known in the art. It is shown in FIG. 13*a* and described briefly herein only in order to indicate one suitable form of operating and control apparatus.

In order to avoid unnecessary operation of the cutoff valve and the difficulties attending subsequent resumption of drilling operations, it is desirable that visual and/or audible warnings be made to precede cutoff valve operation. Such warning may provide sufficient time for corrective measures to alleviate the danger conditions before they become severe enough to warrant closing of the cutoff valve.

A method and apparatus have now been disclosed which may be employed to advantage in developing oil fields under a variety of prevailing conditions. The method and apparatus may, for example, be applied to the development of an oil field which is readily accessible by conventional drilling methods. In such an application of the invention a saving is effected in the cost of the overall development by lessening the required depth of drilling. As previously indicated, the cost of sinking the shaft and driving the tunnel system may be offset by the cost of drilling a determinable number of wells from the surface to the depth of the tunnel system. The drilling of wells in excess of that number results in a set saving for the present method and apparatus.

An application to which the invention is particularly suited is one in which an oil field is not accessible by conventional drilling methods. An offshore oil field is one example of such a situation. In that particular case it is conventional to create an artificial island of either fabricated structure or common fill. Depending upon particular conditions, the cost of the tunnel system of the present invention may be offset by the cost of an island, and the present invention permits further drilling from spaced positions with relatively little additional expense, as opposed to the cost of building further islands.

Many variations of the disclosed tunnel system will be apparent. In a given situation it may be preferred to excavate at an angle. Such an excavation is to be considered, for the purpose of defining the present invention, as a combined shaft and tunnel. Under certain conditions a plurality of main access tunnels may be more practical than a single main tunnel with long side tunnels leading to drilling chambers. An auxiliary tunnel may, in any event, be required in the interest of safety.

A method and apparatus have also been disclosed which permit safe and yet efficient drilling from a tunnel system. One important factor is the safety cutoff valve which is operative to close the conductor pipe in spite of the presence of drill pipe within the conductor pipe. The provision of a lower level tunnel in which the cutoff valve is arranged adds to this safety feature since it isolates the valve and that portion of the conductor pipe below the valve. Automatic control of the cutoff valve by apparatus sensitive to the development of dangerous gas conditions is important to maximum safety. Even though such detecting and control apparatus is well known in the art, its application to the disclosed apparatus produces a combination providing novel safety effects, not obtained in present practice and important to the drilling of oil wells from a tunnel system.

Another important safety feature disclosed herein is the substantially hermetically sealed drill mud system. This serves to confine gas, which commonly escapes from the drill mud, such that it may be exhausted from the tunnel system without reaching the tunnel atmosphere. The disclosed method and apparatus effecting this safety feature is novel in various respects, particularly the method and apparatus embodied in the disclosed wellhead and mud room, and the method and apparatus involved in drilling operations which keep the kelly always above the packing means at the wellhead. Widely divergent modifications of the illustrated and described apparatus, which fall within the spirit and scope of the invention, will be obvious in view of the embodiment of the invention disclosed.

Accordingly, while it will be apparent that the invention may be varied in its physical embodiment without departing from the spirit of the invention, it is desired, therefore, that the invention be limited only by the scope of the appended claims.

The invention having thus been described, what is claimed and desired to be secured by Letters Patent is:

1. In apparatus for drilling oil wells from an underground tunnel system including two vertically displaced chambers, a conductor pipe extending from said upper chamber downwardly through said lower chamber, drill means including a hollow drill pipe rotatable within said conductor pipe, a cutoff valve in said conductor pipe in said lower chamber, said valve having shearing edges for shearing off said drill pipe to permit closing of said conductor pipe when said drill pipe is arranged therein, valve operating means connected to said cut-off valve, and means active upon the presence of either a predetermined concentration of explosive gas in said tunnel system or apparatus, or a predetermined fluid pressure in said conductor pipe, or both, for actuating said valve operating means to close said valve.

2. In apparatus for drilling oil wells from an underground tunnel system including two vertically displaced interconnected tunnels and upper and lower chambers in said tunnels respectively, a conductor pipe extending from said upper chamber downwardly through said lower chamber, drill means including a hollow drill pipe rotatable within said conductor pipe, a cutoff valve in said conductor pipe in said lower chamber, said valve having shearing edges for shearing off said drill pipe to permit closing of said conductor pipe when said drill pipe is arranged therein, and a tapped connection in said conductor pipe below said cutoff valve through which excessive pressure within said conductor pipe may be relieved when said cutoff valve is closed.

3. In apparatus for drilling oil wells from an underground tunnel system, such apparatus including a conductor pipe extending downwardly from said tunnel system into a drill hole and drill means including a hollow drill pipe rotatable within said conductor pipe; a substantially hermetically sealed system for circulating drill mud to remove cuttings from the drill hole, said system including said drill pipe, said conductor pipe, packing means operative between said conductor pipe and said conductor pipe and said drill means for effecting a seal substantially preventing gaseous flow therebetween, enclosed apparatus connected to said conductor pipe for separating such cuttings from the drill mud, and pump means for causing flow of said drill mud from said enclosed separating apparatus down through said drill pipe and back up through said conductor pipe to said enclosed separating apparatus, and discharge means leading from said separating apparatus for discharging cuttings therefrom and having a restricted outlet substantially sealed by the passage therethrough of cuttings and drill mud.

4. In apparatus for drilling oil wells from an underground tunnel system, such apparatus including a conductor pipe extending downwardly from said tunnel system into a drill hole and drill means including a hollow drill pipe rotatable within said conductor pipe; a substantially hermetically sealed system for circulating drill mud to remove cuttings from the drill hole, said system including said drill pipe, said conductor pipe, packing means operative between said conductor pipe and said drill means for effecting a seal substantially preventing gaseous flow therebetween, enclosed apparatus connected to said conductor pipe for separating such cuttings from the drill mud, and pump means for causing flow of said drill mud from said enclosed separating apparatus down through said drill pipe and back up through said conductor pipe to said enclosed separating apparatus, and discharge means leading from said separating apparatus and including a screw conveyor for discharging cuttings therefrom and having a restricted outlet substantially sealed by the passage therethrough of cuttings and drill mud.

5. In apparatus for drilling oil wells from an underground tunnel system such apparatus including a conductor pipe extending downwardly from said tunnel system into a drill hole and drill means including a hollow drill pipe rotatable within said conductor pipe: a substantially hermetically sealed system for circulating drill mud to remove cuttings from the drill hole, said system including said drill pipe, said conductor pipe, packing means operative between said conductor pipe and said drill means for effecting a seal substantially preventing gaseous flow therebetween, enclosed apparatus for separating such cuttings from the drill mud, conduit means connecting said conductor pipe to said enclosed separating apparatus, pump means for causing flow of said drill mud from said enclosed separating apparatus down through said drill pipe, up through said conductor pipe and through said conduit means to said enclosed separating apparatus, and blower means and exhausted piping connected to said conductor pipe above said conduit means for exhausting gas from said conductor pipe and said conductor pipe extending upwardly beyond said packing means for holding a quantity of drill mud over said packing means.

6. In apparatus for drilling oil wells from an underground tunnel system, a substantially hermetically sealed mud room within said tunnel system, apparatus within said mud room for separating cuttings from drill mud, screw means for ejecting such separated cuttings from said mud room, blower means for exhausting gas from said mud room, and piping for conducting such gas from said blower means out of said tunnel system.

7. The method of developing an oil field which comprises sinking a shaft, driving a tunnel from said shaft along a line overlying said oil field, sinking a second shaft from said tunnel to a lower level, driving a second tunnel from said second shaft, installing a conductor pipe extending from said first tunnel downwardly through said second tunnel, drilling with a drill pipe extending through said conductor pipe, and arranging a cutoff valve in said conductor pipe in said second tunnel capable of shearing off said drill pipe whereby said valve may close said conductor pipe when said drill pipe is arranged therein.

8. The method of developing an oil field lying under a body of water which comprises sinking a shaft adjacent the shore line of said body of water, driving a tunnel from said shaft under said body of water and over such oil field, sinking a second shaft from said tunnel to a lower level, driving a second tunnel from said second shaft, installing a conductor pipe extending from said first tunnel downwardly through said second tunnel, drilling with a drill pipe extending through said conductor pipe, and arranging a cutoff valve in said conductor pipe in said second tunnel capable of shearing off said drill pipe whereby said valve may close said conductor pipe when said drill pipe is arranged therein.

9. The method of developing an oil field under an area which is inaccessible for the sinking of wells from the surface which method comprises sinking a first shaft from a point adjacent said area, driving a first tunnel from said first shaft to a point over such oil field, sinking a second shaft from said first tunnel, driving a second tunnel from said second shaft to a point displaced below said first tunnel, excavating from said first tunnel a wholly subterranean drill chamber, excavating from said second tunnel vertically below said drill chamber a safety chamber, extending a conductor pipe downwardly from said drill chamber and through said safety chamber, installing a cutoff valve in the portion of the conductor pipe which extends through said safety chamber for closing said conductor pipe and drilling a well with a drill pipe extending from said drill chamber and through said conductor pipe.

10. The method of developing an oil field lying under a body of water which comprises sinking a shaft adjacent the shore line of said body of water, driving a tunnel from said shaft under said body of water and at a higher level than such oil field, sinking a second shaft from said tunnel to a lower level, driving a second tunnel from said second shaft, installing a conductor pipe extending from said first tunnel downwardly through said second tunnel, drilling with a drill pipe extending through said conductor pipe, and arranging a cutoff valve in said conductor pipe in said second tunnel capable of shearing off said drill pipe whereby said valve may close said conductor pipe when said drill pipe is arranged therein.

References Cited in the file of this patent

UNITED STATES PATENTS

| | | |
|---|---|---|
| 517,337 | Fleuss | Mar. 27, 1894 |
| 909,479 | Thwing | Jan. 12, 1909 |
| 1,517,504 | Hansen | Dec. 2, 1924 |
| 1,802,565 | Lacey | Apr. 28, 1931 |
| 1,880,778 | Byers | Oct. 4, 1932 |
| 2,007,666 | Smith | July 9, 1935 |
| 2,104,660 | Long et al. | Jan. 4, 1938 |
| 2,156,333 | Cross et al. | May 2, 1939 |
| 2,169,675 | Bays | Aug. 15, 1939 |
| 2,331,072 | Hansen et al. | Oct. 5, 1943 |